United States Patent
Tan et al.

(10) Patent No.: US 7,643,960 B2
(45) Date of Patent: Jan. 5, 2010

(54) CORRECTION OF FACTORS IN VEHICLE ACCELEROMETER SIGNALS

(75) Inventors: Hualin Tan, Novi, MI (US); Christopher A. Kinser, Grand Blanc, MI (US); Edmund F. Gaffney, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/681,871

(22) Filed: Mar. 5, 2007

(65) Prior Publication Data

US 2008/0221818 A1    Sep. 11, 2008

(51) Int. Cl.
G01P 15/00 (2006.01)
G01M 17/00 (2006.01)
G06F 7/00 (2006.01)
G06F 19/00 (2006.01)

(52) U.S. Cl. .................... 702/141; 701/29; 701/31
(58) Field of Classification Search ............... 702/141; 701/29, 31
See application file for complete search history.

(56) References Cited

U.S. PATENT DOCUMENTS

| 5,337,257 | A | * | 8/1994 | White | 702/73 |
| 5,579,230 | A | * | 11/1996 | Lin et al. | 701/70 |
| 6,826,502 | B2 | * | 11/2004 | Savard | 702/104 |
| 2007/0088477 | A1 | * | 4/2007 | Brewer et al. | 701/41 |

* cited by examiner

*Primary Examiner*—Eliseo Ramos Feliciano
*Assistant Examiner*—Janet L Suglo

(57) ABSTRACT

A method for measuring and storing values of sensor bias in acceleration values for a vehicle, obtained over a plurality of time periods from a sensor having a specified range of expected variability of sensor bias values, includes measuring a first value of sensor bias obtained during operation of the vehicle in a first time period, storing the measured first value of sensor bias for use in one or more subsequent time periods, measuring a second value of sensor bias obtained during operation of the vehicle in a second time period, subtracting the measured second value of sensor bias from the stored first value of sensor bias, thereby generating a sensor bias difference, and storing the measured second value of sensor bias, for reference in one or more subsequent time periods, if the sensor bias difference is within the specified range of expected variability of sensor bias values.

20 Claims, 3 Drawing Sheets

CORRECTION OF FACTORS IN VEHICLE ACCELEROMETER SIGNALS

TECHNICAL FIELD

The present invention relates generally to a system and method pertaining to vehicle accelerometer signals, and, more particularly, to a system and method for correcting factors in vehicle accelerometer signals.

BACKGROUND OF THE INVENTION

Accelerometers and related sensors are often used to measure lateral acceleration values, longitudinal acceleration values, and/or other values, during operation of a vehicle. While accelerometers generally provide useful information regarding vehicle lateral acceleration and/or other values, accelerometer values can also be influenced by other factors such as electrical bias from a sensor, gravity from a hill, an uneven (bank) road, and/or other environmental conditions.

Attempts have been made to determine and account for sensor bias and environmental conditions in vehicle accelerometers. However, these attempts often provide a less than perfect determination of sensor bias and environmental conditions, for example by treating one factor as constant while determining a value for the other factor. Such attempts can yield less than ideal results, for example due to a "race condition" in which certain steps in determining one factor compete against certain steps in determining another factor.

Accordingly, it is desirable to have an improved method and apparatus for determining and/or accounting for sensor bias and environmental conditions in vehicle accelerometers, without limitations that can lead to a race condition and/or other potential limitations of previous attempts. Furthermore, other desirable features and functions of the present invention will become apparent from the subsequent detailed description of the invention and the appended claims, taken in conjunction with the accompanying drawings and this background of the invention.

SUMMARY OF THE INVENTION

A method is provided for measuring and storing values of sensor bias in acceleration values for a vehicle, in which the acceleration values are obtained from a sensor over a plurality of time periods and the sensor has a specified range of expected variability of sensor bias values. In one embodiment, and by way of example only, the method comprises the steps of measuring a first value of sensor bias in acceleration values obtained from the sensor during operation of the vehicle in a first time period, storing the measured first value of sensor bias for use in one or more subsequent time periods, measuring a second value of sensor bias in acceleration values obtained from the sensor during operation of the vehicle in a second time period, subtracting the measured second value of sensor bias from the stored first value of sensor bias, thereby generating a sensor bias difference, and storing the measured second value of sensor bias, for reference in one or more subsequent time periods, if the sensor bias difference is within the specified range of expected variability of sensor bias values.

A method is provided for determining a value for an environmental condition effect in acceleration values in a present time period for a vehicle using sensor data obtained over a plurality of time periods. In one embodiment, and by way of example only, the method comprises measuring an acceleration value for the present time period, retrieving a stored sensor bias value from a previous time period, and calculating an environmental condition value for the present time period, calculated at least in part from the measured acceleration value for the present time period and the stored sensor bias value from the previous time period.

An apparatus is provided for measuring acceleration values and condition values for a vehicle over a plurality of time periods. In one embodiment, and by way of example only, the apparatus comprises a sensor and a processor. The sensor is configured to measure an acceleration value for a present time period. The processor is configured to retrieve a stored sensor bias value from a previous time period, and to calculate an environmental condition value for the present time period, calculated at least in part from the acceleration value for the present time period and the stored sensor bias value from the previous time period.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
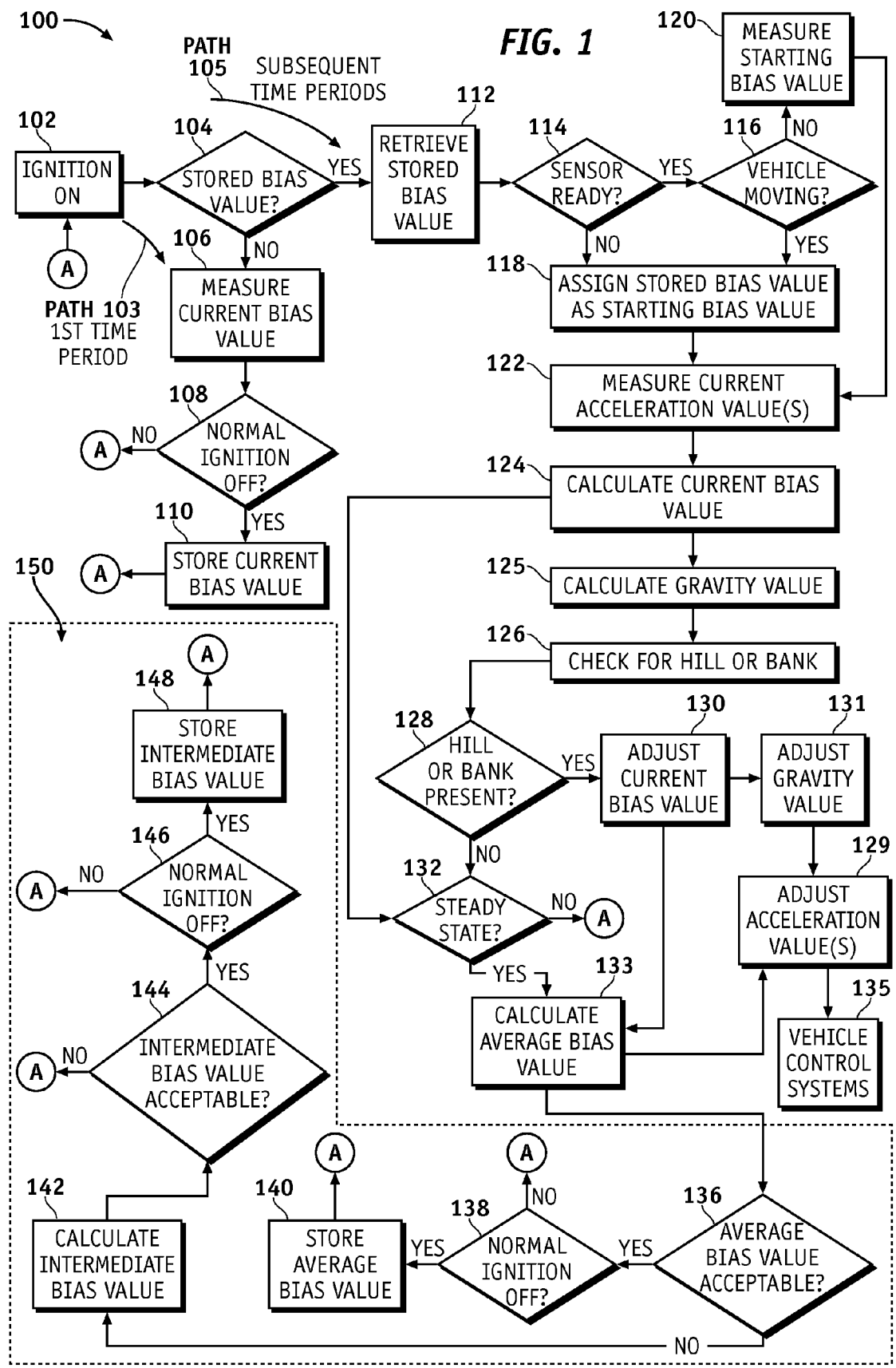
FIG. 1 depicts a flow chart showing an exemplary embodiment of a process 100 for determining sensor bias and gravity values in a vehicle accelerometer for operation of a vehicle over multiple time periods.
Figure 2:
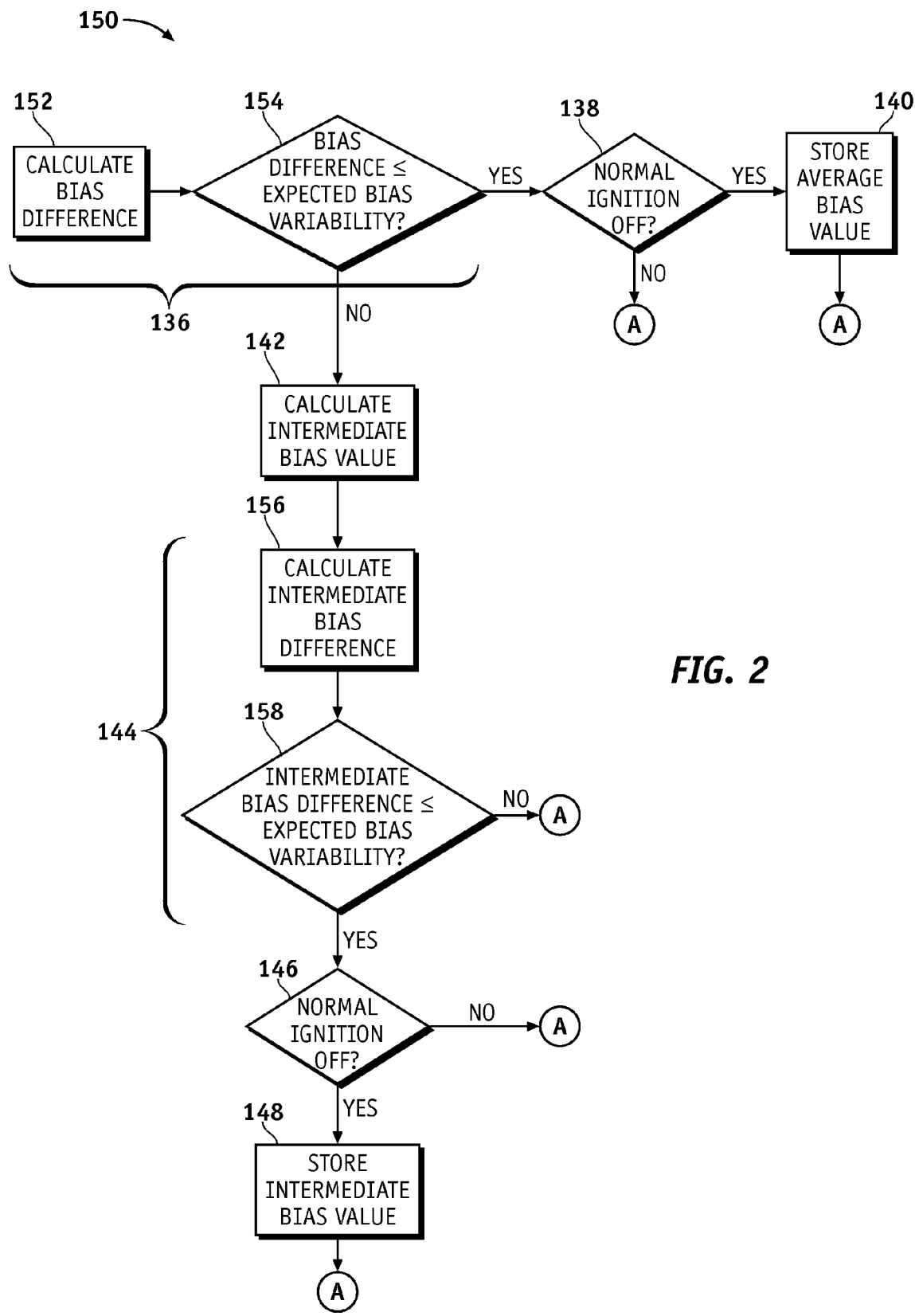
FIG. 2 depicts a flowchart showing an exemplary embodiment of various steps in the process of FIG. 1.

FIGS. 1-2 provide flowcharts showing an exemplary embodiment of a process 100 for determining sensor bias and gravity values in a vehicle accelerometer for operation of a vehicle over multiple time periods.

Figure 3:
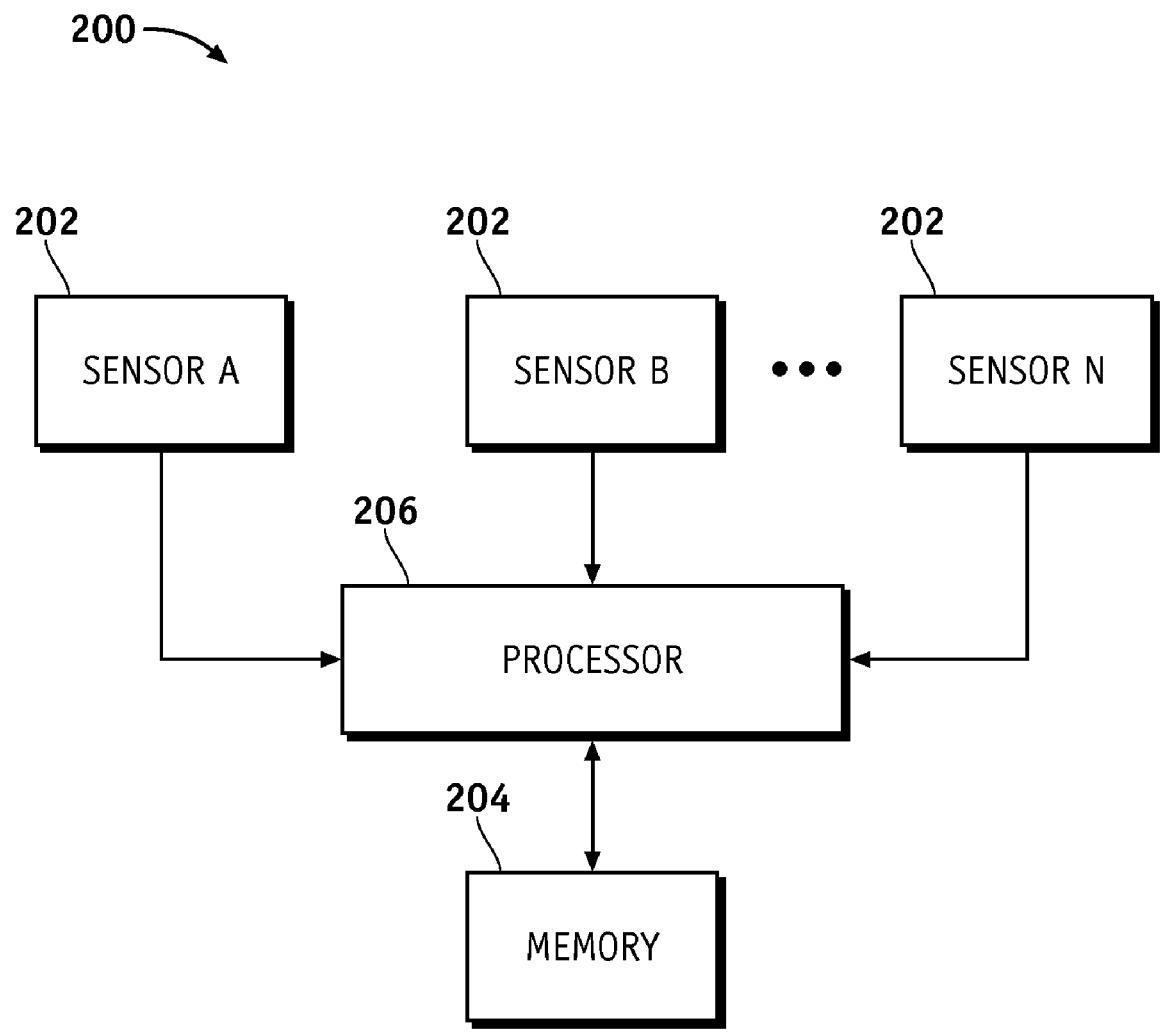
FIG. 3 depicts a diagram of an exemplary system that can be used to implement the process of FIG. 1.

Before proceeding with the detailed description of the steps of process 100, it is noted with reference to FIG. 3 that in a preferred embodiment the process 100 can be implemented via an exemplary system 200 having one or more sensors 202, a memory 204, and a processor 206. The one or more sensors 202 include one or more accelerometers and/or other sensors, and are preferably configured to at least facilitate measurement of lateral acceleration values, longitudinal acceleration values, gravity values, other environmental condition values, and/or any of numerous different other types of values, which can be stored and retrieved in or between different time periods of vehicle operation via the memory 204. The processor 206 is configured to at least facilitate storing and/or retrieving such values and/or other values into or from the memory 204, as well as performing various calculations, determinations, and comparisons pertaining to such values and/or various other information or data pertaining to the vehicle, and/or facilitating operation of the sensors 202 and/or the memory 204, and/or any of various other different potential functions. While FIG. 3 depicts an exemplary embodiment of a system 200 that can be used for implementation of the process 100, it will be appreciated that the process 100 can be implemented using any one of numerous different types of systems.

The process 100 may be used to determine multiple sensor bias values corresponding with a single sensor 202 or multiple sensors 202 for different variables, such as lateral acceleration and longitudinal acceleration, as well as corresponding environmental factors reflecting gravity and/or other environmental conditions. It will similarly be appreciated that, throughout the process 100, multiple acceleration values, sensor bias values, gravity values, other environmental condition values, and/or other values may be determined from separate sensors 202, and/or from separate types of sensors 202, either separately or concurrently.

For example, whenever a sensor bias value is referenced in a step in the process 100, it will be appreciated that such reference may refer to multiple sensor bias values, for example a sensor bias value for lateral acceleration, and a separate sensor bias value for longitudinal acceleration, and/or other sensor bias values. Similarly, it will be appreciated that whenever a gravity value is referenced in a step in the process 100, such reference may refer to multiple gravity values, for example a gravity value pertaining to lateral acceleration, and a separate gravity value pertaining to longitudinal acceleration, and/or other gravity or other environmental factor values. It will also be appreciated that the process 100 can also be implemented in connection with any of numerous other variables and/or measurements.

Returning now to FIG. 1, the process 100 begins with step 102, when the vehicle ignition is turned on. Next, in step 104, it is determined whether or not there is a stored value for sensor bias in a memory, such as the memory 204 shown in FIG. 3. Such determinations, and other determinations, comparisons, calculations, and other functions of the process 100 can be conducted by the processor 206 as shown in FIG. 3. Preferably there will only be a single stored value for each type of sensor bias, if any, at any particular time because, as will be noted further below, if a previous stored sensor bias value already exists when a new sensor bias value is stored, then preferably such new stored sensor bias value replaces the previous stored sensor bias value in the memory.

Returning now to step 104, if it is determined that there is no stored value for sensor bias from an earlier time period, then the process proceeds to step 106, along path 103, corresponding with an initial time period of vehicle operation during which there are no stored values from any previous time periods. Alternatively, if it is determined in step 104 that there is a stored value for sensor bias from an earlier time period, then the process proceeds to step 112, along path 105, corresponding with a subsequent time period.

During the initial time period, under path 103, a current bias value is measured and/or calculated in step 106. Preferably the current bias value is calculated in step 106 from one or more lateral or longitudinal sensors through the duration of the operation of the vehicle during the initial time period, and preferably by calculating an average current bias value over the initial time period. These measurements, and the various other measurements mentioned in connection with the process 100, can be conducted by the one or more sensors 202, while various calculations and other functions can be conducted by the processor 206, as mentioned above and illustrated in FIG. 3. Similarly, when various steps of the process 100 mention storing or retrieving values, such values can be stored and/or retrieved into or from the memory.

While the current sensor bias value is preferably calculated in step 106 as some type of an average, such as an arithmetic mean, of the sensor bias values during the initial time period, it will be appreciated that various other measures may be used. As noted above, it will also be appreciated that different current values may be calculated in step 106 for different types of sensor bias, for example pertaining to lateral acceleration versus longitudinal acceleration, for any number of sensors 202.

Regardless of the particular measure of the current bias value used, the process then proceeds along path 103, upon completion of the first time period of vehicle operation, to step 108, in which it is determined whether there has been a normal shutoff of the vehicle ignition. If it is determined in step 108 that there has been a normal ignition shutoff, then, in step 110, the current bias value is stored in the memory for use in subsequent time periods, and the process begins again with this stored bias value in step 102 once the ignition is turned on again in a subsequent time period. Alternatively, if it is determined in step 108 that there has been an abnormal ignition shutoff, then the current bias value is not stored in the memory, and the process begins again without a stored bias value in step 102 once the ignition is turned on again in a subsequent time period.

During subsequent time periods, under path 105, the stored bias value is retrieved in step 112. Next, in step 114, it is determined whether the sensor is ready and operational for use. If it is determined in step 114 that the sensor is ready and operational, then the process proceeds to step 116—otherwise, the process proceeds to step 118, as set forth further below. In step 116, it is determined whether the vehicle is moving. If it is determined in step 116 that the vehicle is moving, then the process proceeds to step 118, as set forth further below—otherwise, the process proceeds to step 120. In step 120, a starting bias value is measured from the sensor based on the current operation of the vehicle for use in calculations to follow in subsequent steps. Upon completion of step 120, the process moves directly to step 122 (skipping step 118).

Alternatively, if it is either determined (i) in step 114 that the sensor is not ready and operational, or (ii) in step 116 that the vehicle is moving, then the process proceeds to step 118. In step 118, the stored bias values retrieved in step 112 are assigned as the starting bias values for the purposes of the calculations to follow in subsequent steps. Upon completion of step 118, the process proceeds to step 122.

Accordingly, a starting bias value is determined in either step 118 or in step 120 for a particular time period, depending on whether (i) the sensor is ready and operational and (ii) the vehicle is moving. As noted above, it will also be appreciated that different stored bias values may be retrieved in step 112, and/or that different initial bias values may be determined in step 118 or 120, for different types of sensor bias, for example pertaining to lateral acceleration versus longitudinal acceleration.

Regardless of the method of determination of the starting bias value in a particular time period, the process then proceeds to the above-referenced step 122, in which one or more current acceleration values are measured, preferably from one or more sensors. In a preferred embodiment, at least one or more current values for lateral acceleration and longitudinal acceleration are calculated in step 122.

Next, in step 124, one or more current values of sensor bias are calculated, preferably based at least in part on the one or more current acceleration values calculated in step 122. As mentioned above, these and other calculations, determinations, comparisons, and other functions can be conducted in whole or part by the processor 206. Following step 124, the process proceeds along two separate paths. Specifically, the process proceeds directly to step 132 (as will be described further below) along one path, and also to step 125 (as will be described directly below) along another path. These two paths are preferably undertaken simultaneously; however, it will be appreciated that, in certain embodiments, the process may proceed along one path more quickly than the other.

In step 125, one or more gravity values are calculated, preferably based at least in part on both the (i) starting bias value determined in step 118 or step 120 and (ii) the one or more current acceleration values measured in step 122. As noted above, it will also be appreciated that different current sensor bias values may be calculated in step 124, and/or that different gravity values may be determined in step 125, for different types of sensors and/or variables, for example pertaining to lateral acceleration versus longitudinal acceleration.

Next, in step 126, a check is conducted as to whether a hill and/or a bank is present. The check in step 126 is preferably based at least in part on (i) the one or more current acceleration values measured in step 122, and (ii) the stored bias value retrieved in step 112. The stored bias value retrieved in step 112 is preferably used, regardless of whether or not a different starting bias value was measured in step 120, in order to help prevent the above referenced "race condition" or other unwanted interaction or masking of measured variable values. Most preferably, step 126 includes both (i) a determination of whether a bank is present, based at least in part on (a) one or more current lateral acceleration values measured in step 122 and (b) the stored bias value from a lateral acceleration sensor retrieved in step 112; and (ii) a determination of whether a hill is present, based at least in part on (a) one or more current longitudinal acceleration values measured in step 122 and (b) the stored bias value from a longitudinal acceleration sensor retrieved in step 112. The process then proceeds in one of two directions in step 128, based on the determination of whether or not a hill or bank is present, as set forth below.

If it is determined in steps 126 and 128 that a hill or bank is present, then the process proceeds to step 130, at least with respect to one of the sensor bias values (e.g., at least with respect to lateral acceleration sensor bias if a bank is detected, or at least with respect to longitudinal acceleration sensor bias if a hill is detected); otherwise, the process proceeds to step 132, as set forth further below. In step 130, the current bias value is adjusted based on the presence of the hill and/or bank. Following step 130, the process optionally proceeds (i) along one path to step 133 (in which an average bias value is calculated, as will be described in greater detail further below); and (ii) along another path to step 131 (in which an adjusted gravity value is calculated, as will be described directly below). These two paths are preferably undertaken simultaneously; however, it will be appreciated that, in certain embodiments, the process may proceed along one path more quickly than the other.

In step 131, the gravity value is also adjusted, preferably utilizing the information generated in steps 128 and 130, namely regarding the presence of a hill or bank from step 128, and the adjusted current bias value from step 130. Next, in step 129, one or more acceleration value(s) are adjusted, preferably utilizing the hill or bank information from step 128, the adjusted current bias value from step 130, the adjusted gravity value from step 131, and the calculated average bias value from step 133. Next, in step 135, the adjusted acceleration value(s) from step 129 are utilized in vehicle control systems for enhanced operation of the vehicle, and/or any one of a number of other different uses.

It will be appreciated that various types of acceleration value(s) may be adjusted in step 129 and/or used in step 135, including lateral and/or longitudinal acceleration values measured in step 122, preferably as continuously updated in the process, and/or any one of numerous other types of acceleration values. It will also be appreciated that in certain embodiments, the adjustments made in step 129 may utilize some or all of the information from steps 128, 130, 131, and/or 133 (e.g., information from certain steps may not be needed in certain embodiments and/or under certain conditions), and may also utilize various other types of information.

Alternatively, if it is determined in steps 126 and 128 that a hill or bank is not present, then the process proceeds to step 132. As alluded to above, in certain situations the process may proceed to step 132 with respect to certain variables, while proceeding to step 130 with respect to other variables. For example, if in step 128 a bank is detected but not a hill, then the process may proceed to step 130 with respect to lateral acceleration sensor bias values, while simultaneously proceeding to step 132 with respect to longitudinal acceleration sensor bias values. Conversely, if in step 128 a hill is detected but not a bank, then the process may proceed to step 130 with respect to longitudinal acceleration sensor bias values, while simultaneously proceeding to step 132 with respect to lateral acceleration sensor bias values. In addition, as mentioned above, the process preferably also proceeds directly to step 132 immediately following step 124, along the above-described separate path following step 124.

Returning now to step 132, it is determined whether the vehicle has been operating in a steady state during this operational time period. In a preferred embodiment, the determination in step 132 will include factors such as whether the vehicle has been traveling in a relatively straight path, among any one of numerous other potential factors in determining whether the vehicle has been operating in a steady state. If it is determined in step 132 that the vehicle has not been operating in a steady state during this time period, then the process repeats with step 102 after the ignition is turned on for operation of the vehicle in a subsequent time period, without saving any bias values from this time period for use in any subsequent time periods (accordingly, once step 102 repeats in the next iteration under this scenario, the process will begin again with the same stored bias value previously retrieved in step 112 from the prior iteration, because there was no new sensor bias value stored in the prior iteration).

Alternatively, if it is determined in step 132 that the vehicle has been operating in a steady state during this time period, then the process proceeds to step 133, in which an average bias value is calculated. As mentioned above, the process also preferably proceeds to step 133 directly following step 130, and therefore preferably also utilizes the adjusted current bias value(s) generated in step 130. Preferably, the average bias value is calculated as an average value, such as an arithmetic mean, of the current bias value over the current time period. However, it will be appreciated that any one of numerous other measures may be used in calculating the average bias value. In addition, as alluded to above, the calculated average bias value from step 133 is also preferably utilized in step 129 in generating the adjusted acceleration value(s), for use in the vehicle control systems in step 135.

Following step 133, the process also proceeds to steps 136-148. For ease of reference, and as shown in FIG. 1, steps 136, 138, 140, 142, 144, 146, and 148 of the process 100 shall be collectively referenced herein as combined step 150, which will be described in greater detail further below in connection with FIG. 2.

Returning now to FIG. 1, in step 136 it is determined whether the average bias value is an acceptable measure for use in subsequent time periods. If it is determined in step 136 that the average bias value is an acceptable measure for use in subsequent time periods, then the process proceeds to step 138, in which it is determined whether or not there has been a normal ignition shutoff following the completion of the operation of the vehicle in the current time period. If it is determined in step 138 that there has been a normal ignition shutoff, then the average bias value is stored in the memory in step 140 for use in subsequent iterations, and step 102 repeats in the next iteration with this new stored bias value, preferably replacing the old stored bias value previously retrieved in step 112. Alternatively, if it is determined in step 138 that there has been an abnormal ignition shutoff, then the average bias value is not stored in the memory for use in subsequent time periods (accordingly, under this scenario, once step 102 repeats in the next iteration, the process will begin again with the same stored bias value previously retrieved in step 112).

Alternatively, if it is determined in step 136 that the average bias value is not acceptable, then the process proceeds to step 142, in which an intermediate bias value is calculated. As will be discussed in greater detail below with respect to FIG. 2, the magnitude of the intermediate bias value calculated in step 142 is preferably between the respective magnitudes of the average bias value calculated in step 133 and either (i) the stored bias value retrieved in step 112 and/or the initial bias value determined in step 118 or 120.

Next, in step 144, it is determined whether the intermediate bias value, calculated in step 142, is acceptable. If it is determined in step 144 that the intermediate bias value is an acceptable measure for use in subsequent time periods, then the process proceeds to step 146, in which it is determined whether or not there has been a normal ignition shutoff following the completion of the operation of the vehicle in the current time period. If it is determined in step 146 that there has been a normal ignition shutoff, then the intermediate bias value is stored in the memory in step 148 for use in subsequent iterations, and step 102 repeats for subsequent time periods of vehicle operation with this new stored bias value, preferably replacing the old stored bias value previously retrieved in step 112 of the prior iteration.

Alternatively, if it is determined in step 146 that there has been an abnormal ignition shutoff, then the intermediate bias value is not stored for use in subsequent time periods. Similarly, if it is determined in step 144 that the intermediate bias value is not an acceptable measure for use in subsequent time periods, then the intermediate bias value is not stored for use in subsequent time periods. Accordingly, under either of these two scenarios, once step 102 repeats in the next iteration, the process will begin again with the same stored bias value previously retrieved in step 112.

Turning now to FIG. 2, a flowchart is provided detailing various steps of the combined step 150 from FIG. 1. First, in step 152, a bias difference is calculated, preferably by subtracting the average bias value calculated in step 133 from the stored bias value retrieved in step 112. Alternatively, in certain embodiments the bias difference can be calculated in step 152 instead by subtracting the average bias value calculated in step 133 from the initial bias value determined in step 118 or 120.

Next, in step 154 the bias difference calculated in step 152 is compared with a range of values of expected bias variability for the sensor. Preferably the values of expected bias variability are obtained from a manual or other information provided along with the sensor, and/or through experimentation or simulation involving the sensor. However, it will be appreciated that the values of the expected bias variability can be obtained in any one of numerous different manners. Regardless of how they are obtained, the values of expected bias variability preferably include values representing an acceptable range of bias variability for the sensor. As denoted in FIG. 2, the combined steps 152 and 154 correlate with the above-described step 136 from FIG. 1.

If it is determined in step 154 that the bias difference is less than or equal to the expected bias variability (for example, if the bias difference falls within an acceptable range of bias variability for the sensor), then the process proceeds to the above-referenced step 138, in which it is determined whether or not there has been a normal ignition shutoff following the completion of the operation of the vehicle in the current time period. If it is determined in step 138 that there has been a normal ignition shutoff, then the average bias value is stored in the memory in step 140 for use in subsequent iterations, and step 102 repeats for subsequent time periods of vehicle operation with this new stored bias value, preferably replacing the old stored bias value previously retrieved in step 112. Alternatively, if it is determined in step 138 that there has been an abnormal ignition shutoff, then the average bias value is not stored for use in subsequent time periods (accordingly, under this scenario, once step 102 repeats in the next iteration, the process will begin again with the same stored bias value previously retrieved in step 112).

Alternatively, if it is determined in step 154 that the bias difference is greater than the expected bias variability (for example, if the bias difference does not fall within an acceptable range of bias variability for the sensor), then the process proceeds to step 142, in which an intermediate bias value is calculated. As mentioned above with respect to FIG. 1, the magnitude of the intermediate bias value calculated in step 142 is preferably between the respective magnitudes of the average bias value calculated in step 133 and either (i) the stored bias value retrieved in step 112 and/or the initial bias value determined in step 118 or 120.

Specifically, the intermediate bias value is preferably calculated in step 142 by adding a predetermined percentage of the bias difference to the stored bias value or the initial bias value (whichever is used in step 152 in calculating the bias difference). The predetermined percentage is preferably less than one hundred percent, so that the magnitude of the intermediate bias value is between the average bias value and the stored bias value or the initial bias value (whichever is selected for the above-described calculation). The predetermined percentage is also preferably less than fifty percent, so that the magnitude of the intermediate bias value is closer to the stored bias value or the initial bias value (whichever is chosen for the above-described calculation) than to the average bias value from the current time period, effectively giving less weight to the average bias value. Most preferably, the predetermined percentage is less than or equal to ten percent. However, it will be appreciated that different percentages can be used, depending on the amount of weight desired to be given to the average bias value under various scenarios.

Next, in step 156, an intermediate bias difference is calculated, preferably by subtracting the intermediate bias value calculated in step 142 from the stored bias value retrieved in step 112. Alternatively, in certain embodiments the bias difference can be calculated in step 156 instead by subtracting the intermediate bias value calculated in step 142 from the initial bias value determined in step 118 or 120 (e.g., if initial bias value was used in calculating the bias difference in step 152 and the intermediate bias value in step 142).

Next, in step 158, it is determined whether the intermediate bias difference calculated in step 156 is less than or equal to the expected bias variability of the sensor. As denoted in FIG. 2, the combined steps 156 and 158 correlate with the above-described step 144 from FIG. 1.

If it is determined in step 158 that the intermediate bias difference is less than or equal to the expected bias variability of the sensor (for example, if the intermediate bias difference falls within an acceptable range of bias variability for the sensor), then the process proceeds to the above-described step 146, in which it is determined whether or not there has been a normal ignition shutoff following the completion of the operation of the vehicle in the current time period. If it is determined in step 146 that there has been a normal ignition shutoff, then the intermediate bias value is stored in the memory in step 148 for use in subsequent iterations, and step 102 repeats for subsequent time periods of vehicle operation with this new stored bias value, preferably replacing the old stored bias value previously retrieved in step 112.

Alternatively, if it is determined in step 146 that there has been an abnormal ignition shutoff, then the intermediate bias value is not stored for use in subsequent time periods. Similarly, if it is determined in step 158 that the intermediate bias difference is greater than the expected bias variability (for example, if the intermediate bias difference does not fall within an acceptable range of bias variability for the sensor), then the intermediate bias value is not stored for use in subsequent time periods. Accordingly, under either of these two scenarios, once step 102 begins again in the next iteration, the process will use the same stored bias value previously retrieved in step 112 from the prior iteration.

Accordingly, the process 100 is useful in determining sensor bias and gravity values, and/or any of a number of other variables, factors, or values pertaining to the operation of a vehicle over multiple time periods, while minimizing any race condition and/or other difficulties generally encountered in determining such values. Moreover, it will be appreciated that, once these values are determined, they can be readily used to update and/or correct values for lateral acceleration, longitudinal acceleration, and/or for other variables. For example, it will be appreciated that values such as the current bias value calculated in step 124, the gravity value calculated in step 125, the adjusted current bias value generated in step 130, and/or the adjusted gravity value generated in step 131 can be used at any time to update and/or correct such acceleration values for the vehicle, thereby providing even greater accuracy for the vehicle accelerometers and sensors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A method for measuring and storing values of sensor bias in acceleration values for a vehicle, the acceleration values obtained from a sensor over a plurality of time periods, the sensor having a specified range of expected variability of sensor bias values, the method comprising:
   (a) measuring a first value of sensor bias in acceleration values obtained from the sensor during operation of the vehicle in a first time period;
   (b) storing the measured first value of sensor bias for use in one or more subsequent time periods;
   (c) measuring a second value of sensor bias in acceleration values obtained from the sensor during operation of the vehicle in a second time period;
   (d) subtracting the measured second value of sensor bias from the stored first value of sensor bias, thereby generating a sensor bias difference; and
   (e) storing the measured second value of sensor bias, for reference in one or more subsequent time periods, if the sensor bias difference is within the specified range of expected variability of sensor bias values.

2. The method of claim 1, wherein:
the first time period reflects operation of the vehicle under steady state conditions; and
the second value of sensor bias is stored in step (e) only if the second time period also reflects operation of the vehicle under steady state conditions.

3. The method of claim 1, wherein:
the first value of sensor bias reflects an average value of sensor bias during the first time period; and
the second value of sensor bias reflects an average value of sensor bias during the second time period.

4. The method of claim 1, further comprising the steps of:
calculating an intermediate value of sensor bias if the sensor bias difference is not within the specified range of expected variability of sensor bias values, such that the magnitude of the intermediate value of sensor bias is both (i) greater than the magnitude of one of the first or second values of sensor bias and (ii) less than the magnitude of the other of the first or second values of sensor bias;
subtracting the intermediate value of sensor bias form the first value of sensor bias, thereby generating an intermediate difference; and
storing the intermediate value of sensor bias, for reference in one or more subsequent time periods, if the intermediate difference is within the specified range of expected variability of sensor bias values.

5. The method of claim 4, wherein the calculation of the intermediate value of sensor bias comprises the steps of:
multiplying the sensor bias difference by a predetermined percentage between zero and one hundred percent, thereby generating a multiplied value; and
adding the multiplied value to the first value of sensor bias.

6. The method of claim 5, wherein the predetermined percentage is less than or equal to twenty percent.

7. The method of claim 6, wherein the predetermined percentage is less than or equal to ten percent.

8. The method of claim 1, further comprising the steps of:
measuring an acceleration value for a subsequent time period; and
calculating an environmental condition value for the subsequent period, wherein the environmental condition value is calculated:
   at least in part from the measured acceleration value for the subsequent time period and the stored second value of sensor bias from the second time period, if the second value of sensor bias was stored in step (e) for use in one or more subsequent time periods; and
   at least in part from the measured acceleration value for the subsequent time period and the stored first value of sensor bias from the first time period, if the second value of sensor bias was not stored in step (e) for use in one or more subsequent time periods.

9. The method of claim 8, wherein the calculated environmental condition value comprises a value for an effect of gravity on the measured acceleration value.

10. A method for determining a value for an environmental condition effect in acceleration values in a present time period for a vehicle using sensor data obtained over a plurality of time periods, the method comprising:

(a) measuring an acceleration value for the present time period;
(b) retrieving a stored sensor bias value from a previous time period; and
(c) calculating, using a processor, an environmental condition value for the present time period, calculated at least in part from the measured acceleration value for the present time period and the stored sensor bias value from the previous time period.

11. The method of claim 10, wherein the environmental condition value calculated in step (c) comprises a value for an effect of gravity on the measured acceleration value for the present time period.

12. The method of claim 10, further comprising the steps of:
(d) measuring a sensor bias value from the present time period;
(e) subtracting the sensor bias value from the present time period from the stored sensor bias value from the previous time period, thereby generating a sensor bias difference; and
(f) storing the sensor bias value from the present time period, for reference in one or more subsequent time periods, if the sensor bias difference is within a specified range of expected variability of sensor bias values.

13. The method of claim 12, wherein:
the previous time period reflects operation of the vehicle under steady state conditions; and
the sensor bias value from the present time period is stored in step (f) only if the present time period also reflects operation of the vehicle under steady state conditions.

14. The method of claim 12, wherein:
the stored sensor bias value from the previous time period reflects an average value of sensor bias during the previous time period; and
the sensor bias value from the present time period reflects an average value of sensor bias during the present time period.

15. The method of claim 12, further comprising the steps of:
calculating an intermediate value of sensor bias if the sensor bias difference is not within the specified range of expected variability of sensor bias values, such that the magnitude of the intermediate value of sensor bias is both (i) greater than the magnitude of one of the stored sensor bias value from the previous time period and the sensor bias value from the present time period and (ii) less than the magnitude of the other of the stored sensor bias value from the previous time period and the sensor bias value from the present time period;
subtracting the intermediate value of sensor bias form the stored sensor bias value from the previous time period, thereby generating an intermediate difference; and
storing the intermediate value of sensor bias, for reference in one or more subsequent time periods, if the intermediate difference is within the specified range of expected variability of sensor bias values.

16. The method of claim 15, wherein the calculation of the intermediate value of sensor bias comprises the steps of:
multiplying the sensor bias difference by a predetermined percentage between zero and one hundred percent, thereby generating a multiplied value; and
adding the multiplied value to the stored sensor bias value from the previous time period.

17. The method of claim 16, wherein the predetermined percentage is less than or equal to twenty percent.

18. The method of claim 17, wherein the predetermined percentage is less than or equal to ten percent.

19. An apparatus for measuring acceleration values and condition values for a vehicle over a plurality of time periods, the apparatus comprising:
a sensor configured to measure an acceleration value for a present time period; and
a processor configured to:
retrieve a stored sensor bias value from a previous time period; and
calculate an environmental condition value for the present time period, calculated at least in part from the acceleration value for the present time period and the stored sensor bias value from the previous time period.

20. The apparatus of claim 19, wherein:
the sensor is further configured to at least facilitate measuring a present sensor bias value from the present time period, the sensor having a specified range of expected variability of sensor bias values;
the processor is further configured to subtract the present sensor bias value from the stored sensor bias value, thereby generating a sensor bias difference; and
the apparatus further comprises a memory configured to store the present sensor bias value, for reference in one or more subsequent time periods, if the sensor bias difference is within the specified range of expected variability of sensor bias values.

* * * * *